United States Patent [19]
Martinez

[11] Patent Number: 5,818,704
[45] Date of Patent: Oct. 6, 1998

[54] SYNCHRONIZING/DRIVING CIRCUIT FOR A FORWARD SYNCHRONOUS RECTIFIER

[75] Inventor: Roberto Martinez, Redondo Beach, Calif.

[73] Assignee: International Rectifier Corporation, El Segundo, Calif.

[21] Appl. No.: 842,917

[22] Filed: Apr. 17, 1997

Related U.S. Application Data

[60] Provisional application No. 60/017,962 May 20, 1996.

[51] Int. Cl.⁶ .......................... H02M 3/335; H02M 5/42
[52] U.S. Cl. ................. 363/21; 363/16; 363/86; 363/89
[58] Field of Search .................. 363/21, 17, 16, 363/81, 82, 86, 89, 84, 90

[56] References Cited

U.S. PATENT DOCUMENTS

| | | | |
|---|---|---|---|
| 4,809,150 | 2/1989 | Limuti et al. | 363/21 |
| 4,870,555 | 9/1989 | White | 363/21 |
| 4,903,189 | 2/1990 | Ngo et al. | |
| 5,430,640 | 7/1995 | Lee. | |
| 5,457,624 | 10/1995 | Hastings. | |
| 5,568,044 | 10/1996 | Bittner | 323/287 |

FOREIGN PATENT DOCUMENTS

| | | |
|---|---|---|
| 63-245261 | 10/1988 | Japan. |
| 458087 | 5/1992 | Japan. |
| 7298610 | 11/1995 | Japan. |

*Primary Examiner*—Peter S. Wong
*Assistant Examiner*—Rajnikant B. Patel
*Attorney, Agent, or Firm*—Ostrolenk, Faber, Gerb & Soffen, LLP

[57] ABSTRACT

An isolated forward switching power converter includes a primary side circuit and a secondary side circuit having an output inductor, a first MOS gated transistor coupled in series with the output inductor, a second MOS gated transistor coupled in shunt relationship with the output inductor, and a synchronous rectifier control circuit which senses the voltage across the output inductor and alternately biases the first and second transistors on and off in response thereto.

17 Claims, 4 Drawing Sheets

5,818,704

SYNCHRONIZING/DRIVING CIRCUIT FOR A FORWARD SYNCHRONOUS RECTIFIER

CROSS REFERENCE TO RELATED APPLICATION

This application is based on U.S. Provisional Patent Application No. 60/017,962, filed May 20, 1996, entitled SYNCHRONIZING/DRIVING CIRCUIT FOR A FORWARD SYNCHRONOUS RECTIFIER.

BACKGROUND OF THE INVENTION

1. Field of the Invention

The present invention relates to a synchronizing and driving circuit for a forward converter employing a synchronous rectifier.

2. Related Art

In known forward switching power supply circuits employing synchronous rectifiers, the secondary side diodes are replaced by transistors to obtain a lower on-state voltage drop. The transistors must be biased to conduct from source to drain (for an N-channel power MOSFET) when a diode would have been conducting from anode to cathode, and conversely, must be gated to block voltage from drain to source when a diode would have been blocking from cathode to anode.

In these known synchronous rectifier circuits, the gate signals to the transistors must be synchronized as close as possible to the inflection points of the output inductor current, which inflection points correspond to the zero crossings of the squarewave output inductor voltage. The gate signals can be "self-driven" (i.e., the gate signal is tied directly to the circuit) or "controlled synchronized" (i.e., a synchronizing signal is derived from some point in the circuit and fed to a MOSFET gate driver).

Examples of prior art synchronous rectifiers may be found in U.S. Pat. Nos. 4,903,189 to Ngo, et al.; 5,430,640 to Lee; and 5,457,624 to Hastings; and in the following articles: "Synchronous Rectifiers Improve Efficiency in Low Output Voltage Forward Converters" by Clemente, et al. (pp. 347–350) and "The Impact of Low Output Voltage Requirements on Power Converters" by Jitaru, HFPC, May 1995 Proceedings (pp. 1–10).

Some synchronous rectifier circuits of the prior art monitor the primary side control signals and transfer such signals to the secondary side of the power converter (i.e., across the isolation boundary) in order to synchronize the gating of the synchronous transistors. Unfortunately, costly, non-optimal and complex circuitry is required to maintain isolation between primary and secondary portions of the circuit. For example, when opto-isolators are used to maintain isolation, undesirable delays and unpredictable gain variations introduce errors in the system.

Other synchronous rectifier circuits of the prior art use additional transformer windings to transfer synchronizing information to the secondary circuit transistors an still maintain isolation. However, such transformers are more costly and complex and a transformer reset problem also arises.

Accordingly, there is a need in the art for a new synchronous rectifier circuit which does not require opto-couplers or additional transformer windings to transfer synchronizing information across the isolation boundary between primary and secondary circuits in a forward power converter.

SUMMARY OF THE INVENTION

In order to overcome the disadvantages of the prior art synchronous rectifier circuits, the present invention provides "self-driven" gate signals produced by monitoring the voltage across the output inductor of the converter and alternately gating the transistors in response to transitions of the inductor voltage such that one transistor is always on when the other is off, and vice versa.

Other features and advantages of the present invention will become apparent from the following description of the invention which refers to the accompanying drawings.

BRIEF DESCRIPTION OF THE DRAWINGS

For the purpose of illustrating the invention, there is shown in the drawings forms which are presently preferred, it being understood, however, that the invention is not limited to the precise arrangements and instrumentalities shown.

DETAILED DESCRIPTION OF THE INVENTION

Figure 1:
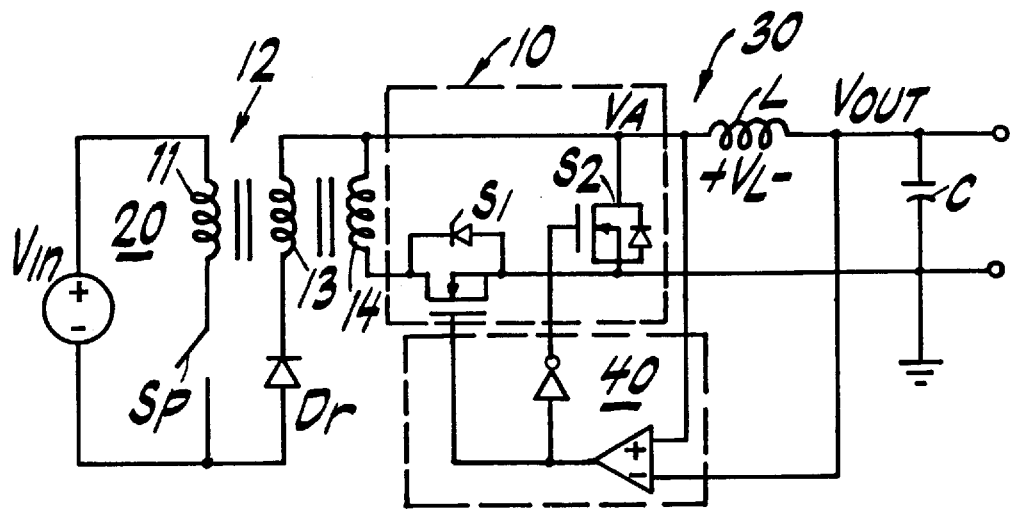
FIG. 1 is a circuit diagram partially in block form of a synchronous rectifier in accordance with the invention.

Referring now to the drawings wherein like numerals indicate like elements, there is shown in FIG. 1 a synchronous rectifier 10 in accordance with the invention which includes a primary circuit 20 and a secondary circuit 30. The primary circuit 20 includes a voltage source $V_{in}$, a primary winding 11 of a transformer 12, a switch $S_p$, a reset winding 13 for resetting the core of the transformer 12 and a reset diode $D_r$. The switch $S_p$, for simplicity, is shown as a single pole, single-throw switch; in actuality, however, the switch may be a conventional MOS-gated semiconductor switch, such as power MOSFET or insulated gate bipolar transistor (IGBT).

The secondary circuit 30 includes a secondary winding 14, an output inductor L, and output capacitor C, a first power transistor $S_1$, and a second power transistor $S_2$. Each power transistor $S_1$, $S_2$ includes an anti-parallel diode thereacross.

A comparator 40 is connected across the output conductor L for sensing the voltage thereacross, $V_L$, that is, for sensing the difference in potential between the voltages $V_A$ and $V_{out}$. The comparator 40 has an output connected to the gate of the transistor $S_1$ and an inverted output connected to the gate of the transistor $S_2$.

When the voltage $V_L$ across the inductor L is positive, the transistor $S_1$ is biased on and the transistor $S_2$ is biased off. Conversely, when the voltage $V_L$ is negative, the transistor $S_2$ is biased on and the transistor $S_1$ is biased off.

Thus, the rectifier 10 has two modes of operation. In the first mode, Mode 1, the transistor $S_1$ is on and conducting current and the transistor $S_2$ is off and blocking current. In the second mode, Mode 2, the transistor $S_1$ is off and blocking current and the transistor $S_2$ is on and conducting current.

Figure 2:
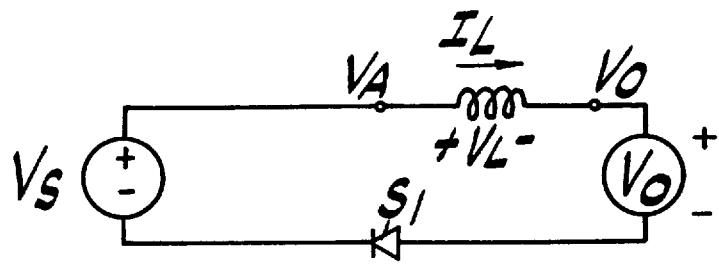
FIG. 2 is an equivalent circuit of a secondary circuit of FIG. 1 during a first mode of operation.

A better understanding of Mode 1 may be had by referring to the equivalent circuit of FIG. 2 in which $V_S$ represents the voltage across the secondary winding 14, transistor $S_1$ is represented by an ideal diode $S_1$, and the output voltage is represented by an output voltage source $V_O$. The relationship between the various voltages is as follows: $V_S = V_L + V_O$, and $V_L = V_S - V_O$. Since $V_S$ is greater than $V_O$, $V_L$ is thus positive.

Also, $I_L$ in Mode 1 is ramping up or increasing. Accordingly, $$\frac{di}{dt}$$

is positive. Since $$V_L = L \frac{di}{dt},$$

this analysis also shows that $V_L$ is positive in Mode 1.

Figure 3:
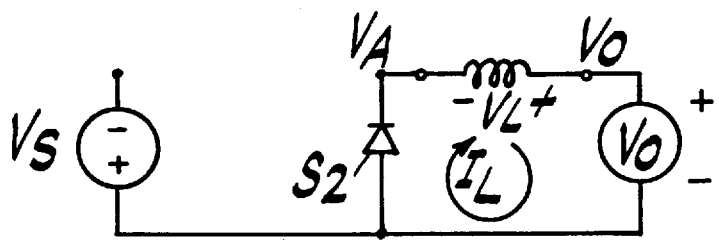
FIG. 3 is an equivalent circuit of the secondary circuit of FIG. 1 in a second mode of operation.

Mode 2, in which the transistor $S_1$ is blocking current and the transistor $S_2$ is conducting current, may be represented by the equivalent circuit shown in FIG. 3, where the transistor $S_2$ is represented by the ideal diode $S_2$. As in the equivalent circuit for Mode 1, $V_S = V_L + V_{out}$ and, therefore, $V_L = V_S - V_{out}$. Here, $V_A$ is zero volts which is less than $V_out$ and, therefore, $V_L$ is negative. Also, in Mode 2, $I_L$ is decreasing or ramping down. Accordingly, $$\frac{di}{dt}$$

is negative. Since $$V_L = L \frac{di}{dt},$$

this analysis also indicates that $V_L$ is negative in Mode 2.

Figure 4:
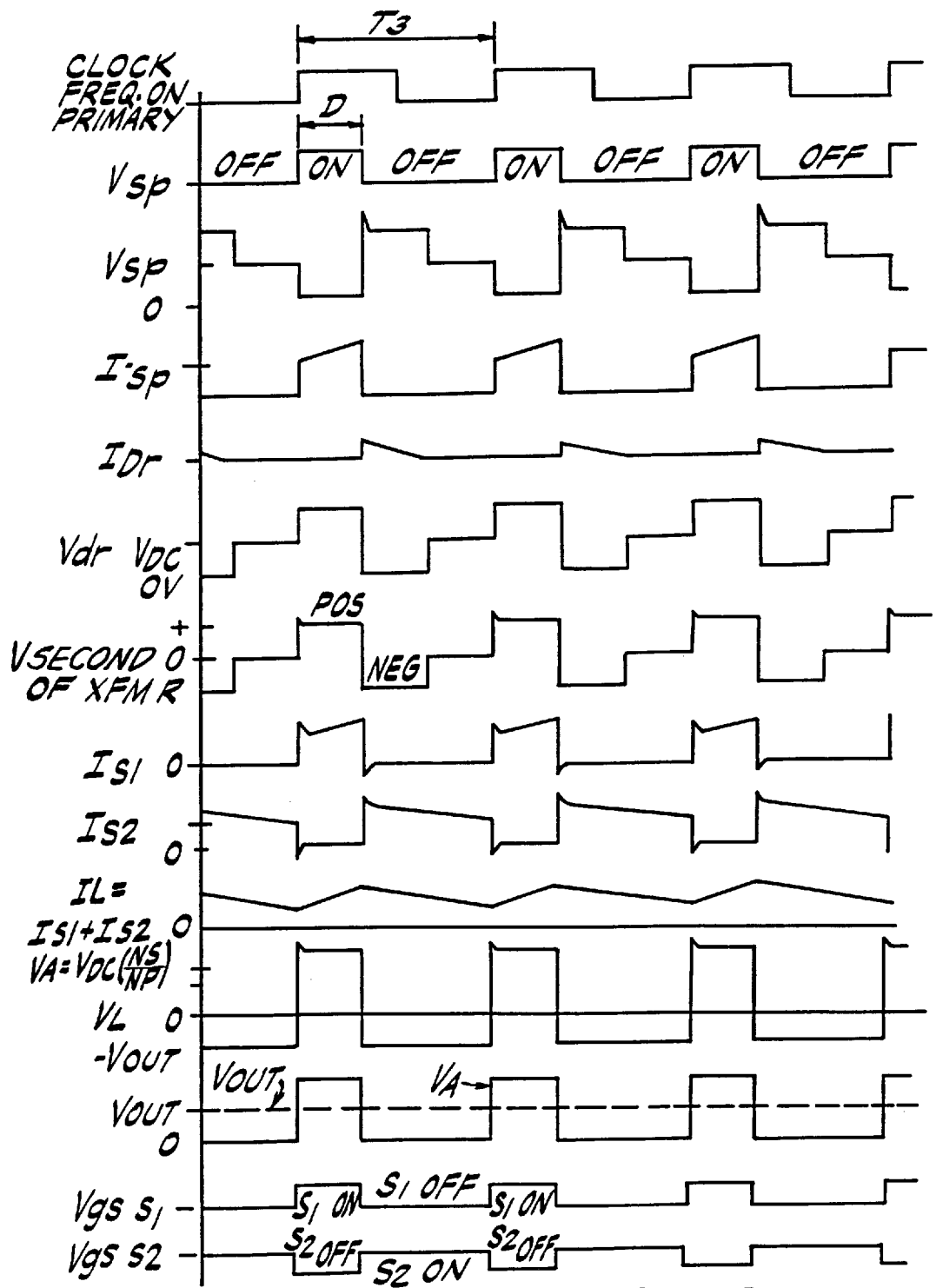
FIG. 4 illustrates waveforms at various points during operation of in the circuit of FIG. 1.

Waveforms occurring at different points in the circuit of FIG. 1 during operation are shown in FIG. 4.

Figure 5:
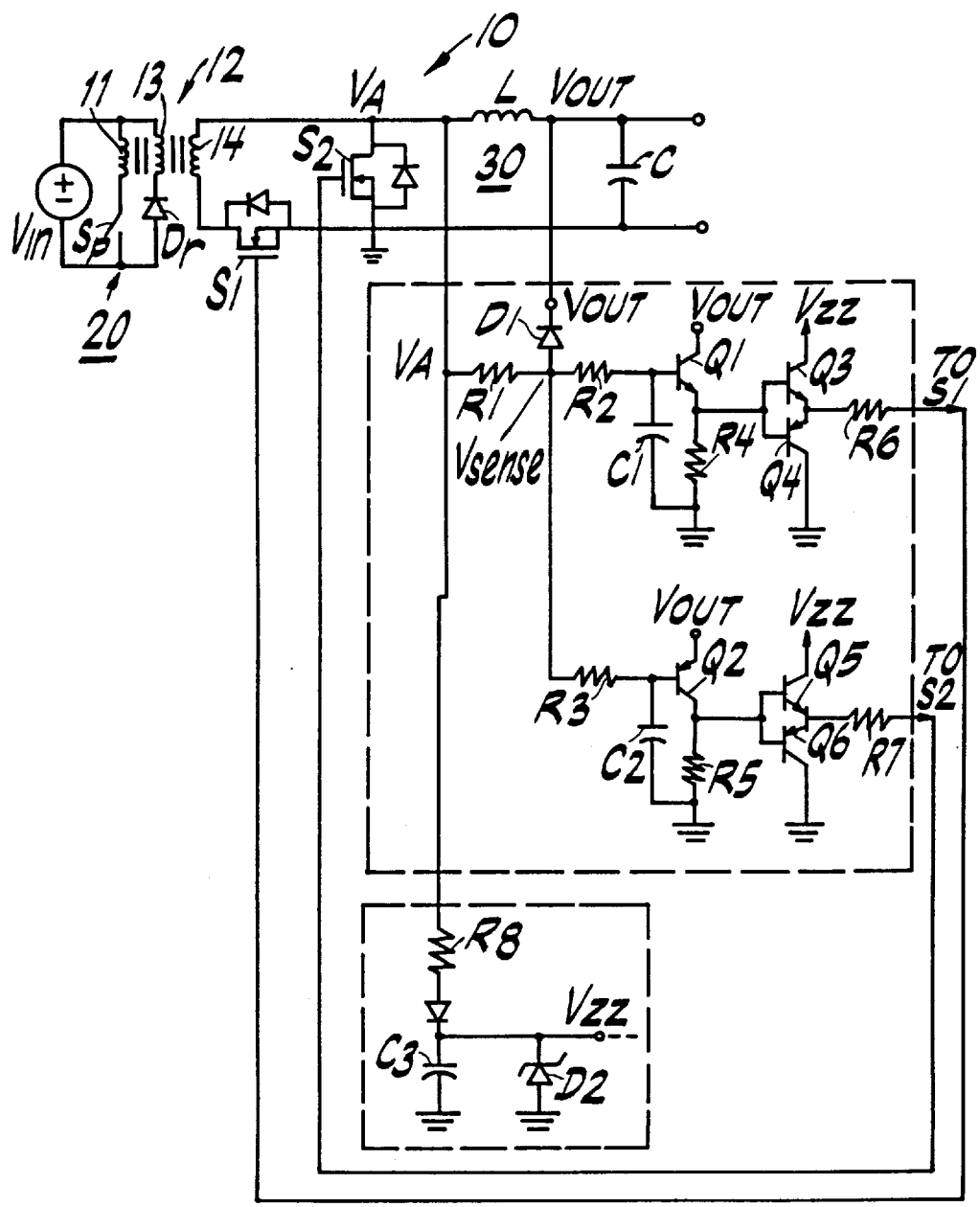
FIG. 5 shows the circuit of FIG. 1 with a comparator shown in the block diagram in FIG. 1 shown in detail in FIG. 5.

Turning now to FIG. 5, there is shown a detailed implementation of the comparator 40 of FIG. 1 which includes a non-inverting transistor comparator $Q_1$ and associated (push-pull) driver transistors $Q_3$ and $Q_4$, and an inverting transistor comparator $Q_2$ and associated (push-pull) driver transistors $Q_5$ and $Q_6$. The transistors $Q_1$ and $Q_2$ respond to the voltage $V_{sense}$ with respect to ground, where $V_{sense}$ changes as a function of $V_L$ and $V_A$.

In Mode 1, $V_A$ is greater than $V_{out}$ (i.e., $V_A = V_{in} \cdot (N_S/N_p)$) and, therefore, $V_{sense}$ is a positive voltage approximately equal to $V_{out} + V_{fd1}$, where $V_{fd1}$ is the forward voltage drop across the diode $D_1$. This results in the transistor $Q_1$, being biased on and $Q_2$ being biased off. The output from the emitter of $Q_1$ is therefore a positive voltage which causes $Q_3$ to turn on and $Q_4$ to turn off. Accordingly, the voltage at the gate of $S_1$ rises to about $V_{ZZ}$ and $S_1$ turns on. Conversely, the output from the collector of $Q_2$ is about zero volts which causes $Q_6$ to turn on and sweep the charge off the gate of $S_2$ and turn it off.

In Mode 2, $V_A$ is less than $V_{out}$ (i.e., $V_A \sim 0$ volts) and, therefore, $V_{sense} = V_A \sim 0$ volts. This results in transistor $Q_1$ being biased off and $Q_2$ being biased on. The output from the collector of $Q_2$ is therefore a positive voltage which causes $Q_5$ to turn on and $Q_6$ to turn off. Accordingly, the voltage at the gate of $S_2$ rises to about $V_{ZZ}$ and $S_2$ turns on. Conversely, the output from the emitter of $Q_1$ is about zero volts which causes $Q_4$ to turn on and sweep the charge off the gate of $S_1$ and turn it off.

Thus, the gating of $S_1$ and $S_2$ is a function of the voltage $V_L$ across the inductor L, that is, when $V_L$ is positive, $S_1$ is biased on (the gate of $S_1$ is positive with respect to its source) and $S_2$ is biased off (the gate of $S_2$ is low with respect to its source). When $V_L$ is negative, on the other hand, $S_1$ is biased off and $S_2$ is biased on.

Advantageously, the gate of the transistors are "self driven" by sensing conditions in the secondary circuit 30, namely the inductor voltage, $V_L$. Thus, there is no need for expensive, unpredictable and slow opto-isolators or additional windings in the transformer 12. Further, the efficient utilization of discrete components obviates the need for expensive integrated circuit type comparators.

It is noted that diode $D_1$ advantageously limits the voltage at $V_{sense}$ to one diode drop above $V_{out}$ which also limits the voltage input to $Q_1$ and $Q_2$. Thus, the circuit is immune to back oscillation at peak values of $V_A$ because such peak values are not fed back in the circuit of the present invention. Further, by limiting maximum excursions of $V_{sense}$ to about $V_{out}$, the transistors are off when $V_{out}$ is under voltage (i.e. when $V_{out}$ is less than 1) thereby providing for enhanced start up characteristics of the converter.

It is noted that $D_1$ allows an extra diode drop of driving voltage for driving $Q_1$–$Q_6$ (i.e., $V_{sense} = V_{out} + V_{fD1}$). Nonetheless, if $V_{out}$ is designed to be a very low output which would not allow proper drive voltage to $Q_1$–$Q_6$, then the cathode of diode $D_1$ may be connected to $V_{ZZ}$. Thus, a higher voltage would be obtained to drive $Q_1$–$Q_6$ (i.e., $V_{sense} = V_{ZZ} + V_{FD}$)

Capacitors $C_1$ and $C_2$ are used to introduce respective time delays into the circuits of $Q_1$ and $Q_2$ in order to provide a requisite deadtime.

The reason for deadtime is as follows: The synchronous rectifier gate signals needs to be synchronized as closely as possible to the transitions in $V_L$ (i.e., the zero crossing points). If the respective gates are on too long (i.e., turned on early, turned off late), current overshoot or oscillation due to cross conducting between $S_1$ and $S_2$ can occur. If the respective gates are turned on too late or turned off too early, the anti-parallel diode of the power MOSFETs will conduct giving higher conduction losses while it conducts and reverse recovery effects when turned off as the voltage swings to the opposite polarity.

Thus, to avoid cross-conduction, when $V_A$ is greater than $V_{out}$, the transistor $S_1$ turns on after a deadtime and the transistor $S_2$ turns off. Conversely, when $V_A$ is less than $V_{out}$, the transistor $S_1$ turns off and the transistor $S_2$ turns on after a deadtime. Advantageously, the amount of deadtime can be predetermined to allow for designs having different types of power MOSFETs.

The resistor $R_8$, capacitor $C_3$ and diode $D_2$ serve as a driving power source or auxiliary source of DC power. Alternatively, $V_{out}$ can be used as $V_{ZZ}$ if $V_{out}$ is high enough to provide sufficient drive voltage to the gates of $S_1$ and $S_2$ to reduce the forward resistance thereof (i.e., to fully enhance the transistors $S_1$ and $S_2$).

$R_8$ serves as a bleeding resistor to charge $C_3$. $C_3$ provides the current to the circuit and maintains $V_{ZZ}$ according to the breakdown voltage $V_{D2}$ of the zener diode $D_2$. If $V_A$ is greater than $V_{D2}$ then $V_{ZZ}$ is approximately equal to the breakdown voltage of the zener diode $D_2$. On the other hand, if $V_A$ is less than $VD_2$, then $V_{ZZ}$ is approximately equal to the peak value of $V_A$.

Advantageously, the $V_{ZZ}$ supply permits driving the power MOSFETs with high enough voltage to fully enhance the devices and lower their forward resistances. This mitigates the need for an extra winding on the transformer or an extra power supply.

Figure 6:
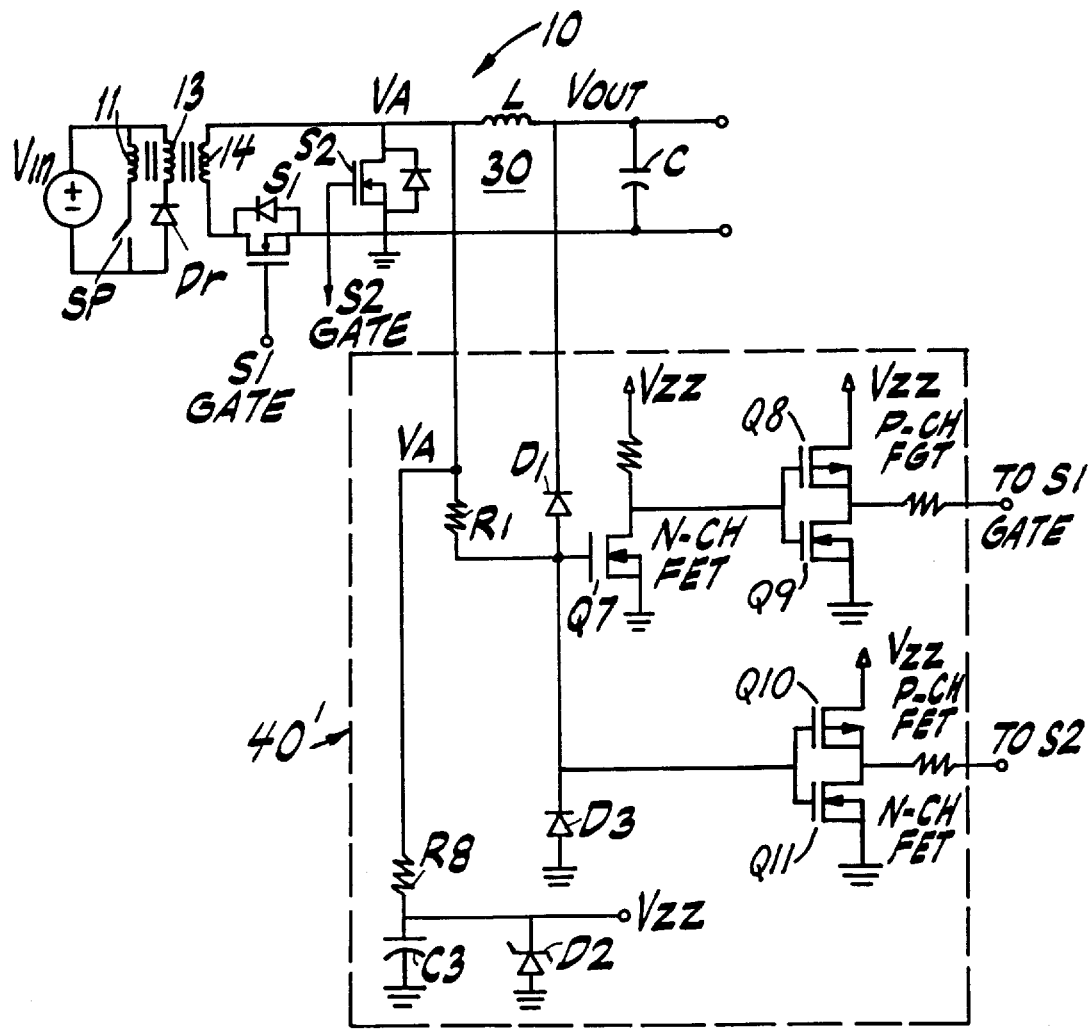
FIG. 6 shows an alternative embodiment of the comparator of FIG. 5.

FIG. 6 shows an alternative embodiment 40' of the comparator 40 of FIG. 5. In the embodiment of FIG. 6, FET transistors $Q_7$–$Q_{11}$ are used in place of the bipolar transistors $Q_1$–$Q_6$ of FIG. 5. Operation of this embodiment is essentially the same as the embodiment of FIG. 5. More specifically, when $V_A$ is greater than $V_{out}$, a high voltage is inputted to the gate of $S_1$ and a low voltage is inputted to the gate of $S_2$. Conversely, when $V_A$ is less than $V_{out}$, a low voltage is applied to the gate of $S_1$ and a high voltage is applied to the gate of $S_2$.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. An isolated forward switching power converter, comprising:
   a primary side circuit coupled to a primary winding of an isolation transformer; and
   a secondary side circuit coupled to a secondary winding of the isolation transformer, the secondary side circuit including:
   an output inductor coupled in series with the secondary winding at a first node and coupled at a second node to an output capacitor across which an output voltage is taken;
   a first MOS gated transistor coupled in series with the secondary winding and the output inductor;
   a second MOS gated transistor coupled in shunt from the first node to ground; and
   a synchronous rectifier control circuit coupled to the first and second MOS gated transistors the synchronous rectifier circuit sensing the voltage across the output inductor and alternately biasing the first and second transistors on and off in response thereto,
   wherein the peak value of the sensed inductor voltage is limited to the output voltage.

2. The isolated forward switching power converter of claim 1, wherein one terminal of a resistor is coupled to the first node, the cathode of a diode is coupled to the second node, the anode of the diode is coupled to the other terminal of the resistor at a third node and the sensed inductor voltage is obtained from the third node.

3. The isolated forward switching power converter of claim 1, wherein the peak value of the sensed inductor voltage is limited to an auxiliary source of DC voltage.

4. The isolated forward switching power converter of claim 1, wherein the secondary circuit further comprises an auxiliary source of DC voltage, the auxiliary source of DC voltage being taken across a zener diode, the zener diode coupled to the first node through a blocking diode and current limiting resistor.

5. The isolated forward switching power converter of claim 4, wherein the peak value of the sensed inductor voltage is limited to at least one of the output voltage and the auxiliary source of DC voltage.

6. The isolated forward switching power converter of claim 5, wherein one terminal of a resistor is coupled to the first node, the cathode of a diode is coupled to the auxiliary source of DC voltage, the anode of the diode is coupled to the other terminal of the resistor at a third node and the sensed inductor voltage is obtained from the third node.

7. The isolated forward switching power converter of claim 1, wherein the sensed voltage is coupled to a non-inverting sense circuit and an inverting sense circuit.

8. The isolated forward switching power converter of claim 7, wherein the non-inverting sense circuit includes a non-inverting amplifier coupled to a first drive circuit and the first drive circuit is coupled to the gate of the first transistor.

9. The isolated forward switching power converter of claim 8, wherein the non-inverting amplifier includes a bipolar transistor connected in an emitter follower configuration and the first drive circuit includes a bipolar push-pull transistor pair.

10. The isolated forward switching power converter of claim 8, wherein the non-inverting amplifier includes a MOS gated transistor and the first drive circuit includes a MOS gated push-pull transistor pair.

11. The isolated forward switching power converter of claim 8, wherein the inverting sense circuit includes an inverting amplifier coupled to a second drive circuit and the second drive circuit is coupled to the gate of the second transistor.

12. The isolated forward switching power converter of claim 11, wherein the inverting amplifier includes a bipolar transistor and the second drive circuit includes a bipolar push-pull transistor pair.

13. The isolated forward switching power converter of claim 8, wherein the inverting amplifier includes a MOS gated transistor and the second drive circuit includes a MOS gated push-pull transistor pair.

14. An isolated forward switching power converter, comprising:
   a primary side circuit coupled to a primary winding of an isolation transformer; and
   a secondary side circuit coupled to a secondary winding of the isolation transformer, the secondary side circuit including:
   an output inductor coupled in series with the secondary winding at a first node and coupled at a second node to an output capacitor across which an output voltage is taken;
   a first MOS gated transistor coupled in series with the secondary winding and the output inductor;
   a second MOS gated transistor coupled in shunt from the first node to ground;
   a synchronous rectifier control circuit coupled to the first and second MOS gated transistors, the synchronous rectifier circuit sensing the voltage across the output inductor and alternately biasing the first and second transistors on and off in response thereto, wherein:
   the sensed voltage is coupled to a non-inverting sense circuit and an inverting sense circuit;
   the non-inverting sense circuit includes a non-inverting amplifier coupled to a first drive circuit and the first drive circuit is coupled to the gate of the first transistor; and
   the inverting sense circuit includes an inverting amplifier coupled to a second drive circuit and the second drive circuit is coupled to the gate of the second transistor.

15. The isolated forward switching power converter of claim 14, wherein the first and second drive circuits obtain a source voltage from the output voltage.

16. The isolated forward switching power converter of claim 14, wherein the secondary circuit further comprises an auxiliary source of DC voltage, the auxiliary source of DC voltage being taken across a zener diode, the zener diode coupled to the first node through a blocking diode and current limiting resistor.

17. The isolated forward switching power converter of claim 16, wherein the first and second drive circuits obtain a source voltage from the auxiliary source of DC voltage.

* * * * *